(12) United States Patent
Oltedal

(10) Patent No.: US 6,393,120 B1
(45) Date of Patent: May 21, 2002

(54) ARRANGEMENT IN A NETWORK STRUCTURE

(75) Inventor: Einar Oltedal, Kolbjørnsvik (NO)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/244,975

(22) Filed: Feb. 4, 1999

(30) Foreign Application Priority Data

Feb. 6, 1998 (NO) .............................................. 980519

(51) Int. Cl.[7] .......................... H04M 3/42; H04M 7/00; H04M 11/00

(52) U.S. Cl. ............................... 379/221.11; 379/93.01; 379/201.04

(58) Field of Search ................................. 379/207, 230, 379/93.01, 93.17, 201.04, 221.08, 221.09, 221.1, 221.11, 221.12

(56) References Cited

U.S. PATENT DOCUMENTS

| | | | |
|---|---|---|---|
| 5,394,461 A | 2/1995 | Garland | ................. 379/106.09 |
| 5,416,831 A | 5/1995 | Chewning, III et al. | 379/201 X |
| 5,425,097 A | 6/1995 | Pula | ........................... 379/396 |
| 5,524,141 A | 6/1996 | Braun et al. | ............ 379/201 X |
| 5,541,986 A | 7/1996 | Hou | ............................ 379/201 |
| 5,570,420 A | 10/1996 | Bress et al. | ................. 379/220 |
| 5,635,980 A | 6/1997 | Lin et al. | ....................... 348/13 |
| 5,657,378 A | 8/1997 | Haddock et al. | .......... 379/93.23 |
| 5,999,526 A | * 12/1999 | Garland et al. | ...... 379/93.01 X |

* cited by examiner

Primary Examiner—Harry S. Hong
(74) Attorney, Agent, or Firm—Jenkens & Gilchrist PC

(57) ABSTRACT

The present invention relates to an arrangement in a network structure, especially an IN (Intelligent Network) structure, comprising ADSI (Analogue Display Services Interface) and associated servers communicating with ADSI capable devices, and for the purpose of improving the user interface in connection with such devices, it is according to the present invention suggested that said ASDI servers are adapted to a system for use as IPs (Intelligent Peripherals) in combination with especially ADSI compliant telephones.

20 Claims, 1 Drawing Sheet

ARRANGEMENT IN A NETWORK STRUCTURE

FIELD OF THE INVENTION

Figure 1:
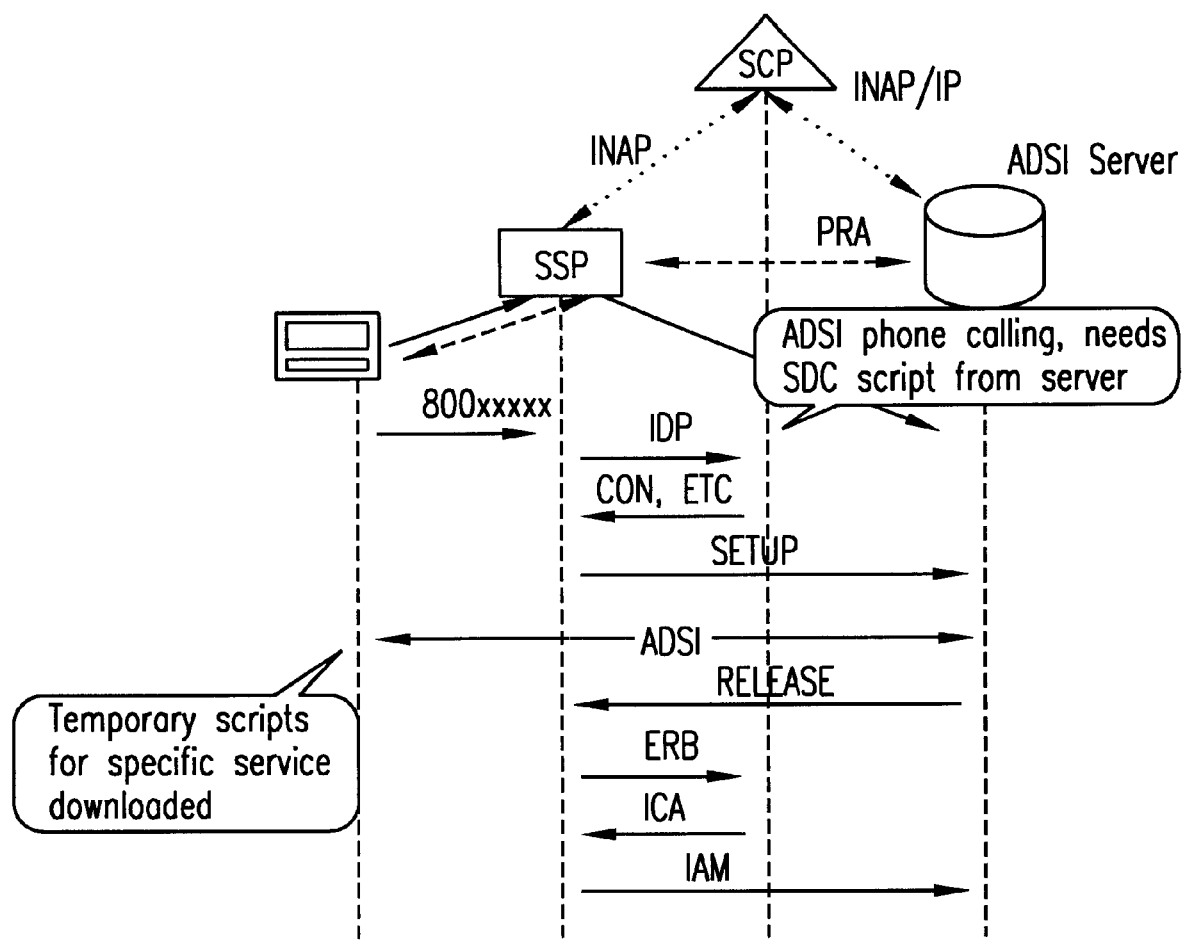

The present invention relates to an arrangement in a network structure, especially an IN (Intelligent Network) structure, comprising ADSI (Analogue Display Services Interface) and associated servers communicating with ADSI capable devices.

BACKGROUND OF THE INVENTION

The basic problem with such an arrangement, is lack of user to network protocols that would allow a better user interface for IN services. The actual protocol today is relying on in-band DTMF signalling. The development of standards are rather slow. Even with ISDN, where the user to user signalling is not meant as a user to network protocol, one has to rely on DTMF signalling.

The first standard IN protocol from ITU is called CS1. It has no user-network capabilities. In the next release, CS2, user to network operations are defined, both call related and call unrelated.

ADSI is a Bellcore standard for user to network protocol. It is carried by DTMF and FSK signalling. It was developed for analogue accesses with screen based phones. It can also be applied to ISDN interfaces.

ADSI should therefore have the potential to improve the user interface for IN services in the PSTN/ISDN network.

PRIOR ART

The only known solution to the IN user interface are different DTMF devices. With an ADSI phone used for example as an UPT terminal the main menu could be displayed on the terminal thereby greatly improving the user interface.

However, the DTMF devices are simple devices with no screen based menus. Further, there is no protocol for downloading of menus.

U.S. Pat. No. 5,541,986 discloses a method and system for programming ADSI compatible telephones by downloading scripts from the network to the telephone sets. The method is based on the specification of a general template for the sequence of services for thereafter specifying the attribute of the features which will be combined into service modules.

U.S. Pat. No. 5,416,831 discloses a system for communicating with an ADSI compatible telephone via a service circuit node. The service circuit node is connected to the PSTN network via an SSP communication port, such that text information and instructions can be transferred. The system also comprises a menu system.

U.S. Pat. No. 5,635,980 discloses a system and a method for achieving a broad band CPE interface which can be attached to ADSI based screen telephones. The interface comprises ADSI on-hook alerting circuits and additionally ASMS circuits for supplying screen telephones with programming information.

U.S. Pat. No. 5,394,461 discloses a control method being used in a telephone switching system. The method comprises an extension of the telemetric protocol determining the attributes of the system.

U.S. Pat. No. 5,570,420 discloses a customer premise equipment network integrator (CNI) being connected to two-day's integrated telephone network to provide the users with additional and improved telephone services.

U.S. Pat. No. 5,657,278 discloses a digital screen phone terminal with graphical user interface. This prior art suggests that the telephone unit in a rapid and convenient manner can be upgraded or modified by downloading new software which is installed in a programmable digital signal processor.

U.S. Pat. No. 5,425,097 discloses an analogue display station apparatus and a method for effecting telephone features. The station receives and stores screen control data and thereafter influences at least one of the attributes of the telephone.

Although the prior art relates to ADSI based telephones and downloading of information/instructions thereto, the same prior art is silent about how to allow better user interface for IN services than prior art systems based on protocols having "in-band DTMF" signalling.

Still further, the prior art is silent about a protocol making it possible to download menus to screen telephones.

OBJECTS OF THE INVENTION

An object of the present invention is to suggest a better utilization of the arrangement as stated in the preamble, especially the IN services thereof.

Another object of the present invention is to provide an arrangement whereby the associated ADSI service can be used as IPs for IN.

Still another object of the present invention is to provide an improved arrangement wherein menus for IN services can be downloaded on service based ADSI phones under the control of IN.

SUMMARY OF THE INVENTION

The above objects are achieved in an arrangement of the type as stated in the preamble, which according to the present invention is characterized by the features as stated in the appending patent claims.

The present solution can also be summarized by the following items:

1. Defining IN trigger data in the SSP to contain an ADSI indicator which must be sent to the SCP in the IDP operation. This tells the actual IN service that the terminal has ADSI capabilities.
2. ADSI servers must be configured with the correct IN/ADSI scripts.
3. At IN call set-up the concerned SCP will control the downloading of ADSI script from the ADSI server to the caller.

Further, also the following items should be observed for defining the present invention:

A new INAP call indicator to indicate that the calling terminal is an ADSI compliant phone.

Improve the IN user inferface by deploying IN menus on screen based ADSI phones.

Using ADSI servers as IN IPs for downloading of features or Server Display Control of ADSI terminals.

Further features and advantages of the present invention will appear from the following description taken in conjunction with the enclosed drawing.

BRIEF DISCLOSURE OF THE DRAWING

FIG. 1 is a schematical diagram illustrating an embodiment of the present invention, wherein an ADSI server is used as a stand alone IP.

DISCLOSURE OF EMBODIMENTS

Intelligent Network System

The Intelligent Network (IN) concept has been introduced as a method to enable telecom network providers to quickly implement new cost effective network services, in particular in voice telephony.

The main contents of the IN are to separate the call or service switching functions (SSF) and call or service control functions (SCF), traditionally located in the PSTN local exchanges. The separation generally implies the relocation of the SSF and SCF into new systems as separate network elements called Service Switching Point (SSPs) and Service Control Points (SCPs).

The Early Days

In the early days of IN the SSPs were implemented in public switches, while the SCPs were implemented in the switches or sometimes in general purpose mini computers. Consequently, the industry envisaged large IN platforms as a central resource for the network operator for new service implementation.

Some major problems were encountered early in the large platform approach. For example, when all services are implemented on the same platform, questions are raised concerning service interaction aspects and a great future system complexity can be expected.

Teligent's IN-approach

Teligent introduces a distributed IN approach. The IN SSF and SCF are contained in down-sized IN platforms. If a large IN call capacity is required, the down-sized IN systems are distributed over the network while maintaining a central point of control for the service operations and the corresponding operations support systems.

One consequence of the Teligent IN approach is that different business units may have their own service platforms. In this way new services ca be introduced much faster and much more cost effective than by using a central platform approach. The important aspect of system complexity is also solved in this way. By the Teligent approach future system software maintenance and modification costs are kept at a minimum.

In Support of Intelligent Telephones

With the threats from deregulation and internet the telcos are meeting increased competition in the end user market. They can only keep their customers by improving the service/price offering. One key issue will be an improvement in the user interface. Traditional phones are very primitive in this regard and are lacking far behind what is technical possible to do.

The internet has already shown what will be an important technology in this area, the concept of the "Java Phone" where software which enhances the end user interface are controlled and down loaded from servers in the network. The concept of Java Phone should also be applied to PSTN and ISDN terminals.

On the PSTN side there is already a standard for this called ADSI, Analogue Display Service Interface. This is a standard for how to define telephone interfaces and the protocol to control such telephones in the PSTN.

In ISDN there is so far no standard for this. However the next DSS1 release will have protocol enhancements called call unrelated related signalling which would allow remote down loading of scripts and remote control of the end user interface.

ADSI

ADSI (Analogue Display Services Interface) is a telecommunications protocol standard published by Bellcore in December of 1993. It enables alternate voice and data capability over the existing analogue telephone network. This means that in addition to the familiar voice response audio interface (where you listens to voice recordings and make menu selections using the telephone keypad), you can now see the menu and information on the screen display and make selections using soft keys (think of the ATM machine interface, but with new capability for voice instructions and background music).

ADSI defines two types of network-to-CPE communications: Server Display Control (SDC) and Feature Download (FD).

Server Display Control

Real-time interactive applications using an ADSI capability is called Server Display Control or SDC. Server Display Control provides temporary downloading for the current transaction. The remote host sends messages through the network which provide instructions for the CPE on how to display information and user interface control mechanisms. The screen display responds or issues some command that causes the remote host to send another set of messages through the network until the user or the server terminates the "conversation". One of the major advantages of the Server Display Control aspect of ADSI is that it minimises the amount of change required in the network, building on existing switch capabilities.

Feature Download

FD provides semi-permanent downloading of a service script from a server into the CPE. The service script provides the functional logic of the service as well as instructions on how to display information and user interface control mechanisms, such as dynamic softkeys. The remote host sends a script partitioned into messages through the network and is later loaded into memory resident in the CPE. With this capability, your telephone company can download a call management (telephony) script tailored to your service subscription. As a result, you can activate services such as three-way Calling, Call Waiting, Call Forwarding, etc., through context sensitive screen prompts and soft keys.

ADSI Servers as IPs for IN

In the following and under reference to FIG. 1 there will now be disclosed an IN network structure wherein ADSI servers are used as IPs (Intelligent Peripherals) in combination with ADSI compliant phones.

Two implementations of the ADSI server are discussed:

An implementation based on a CS1 compliant SCP which require minimum modifications on the ADSI server where the server is a stand alone IP.

An implementation based on a CS1 compliant SCP which server is a networked IP. In this case the server must have an INAP (CS1) interface.

Using an ADSI server as an IP in the IN network would have synergy effects on both the ADSI side and IN side. The existing IN services could be improved by using ADSI phones and IN would mean an increased flexibility regarding services and management on the ADSI server.

ADSI Server as Stand Alone IP

The ADSI protocol uses both FSK and DTMF. FSK is used for data messages towards the terminal, and in the CPE-network direction DTMF is used. In this implementation one avoids having ADSI interface in IN (SSP) and the ADSI protocol is only applied in the first phase of the call before the IN specific service script is executed. The idea is to load down a temporary script in the terminal which can be used for the rest of the call. After release from the server the communication is between the ADSI terminal and IN using DTMF.

In this scenario the following happens:

1. An IN call is set up from an ADSI telephone.
2. A call indicator tells the SCP(sent in IDP) that this is a call for a specific IN service from an ADSI terminal.
3. The SCP decides to set up a temporary connection (CON) to an ADSI server which has the ADSI scripts for the terminal.
4. There is now a connection established from the phone to the server. The server will now download the correct script to the phone using the ADSI protocol.

5. The SCP monitors for release message from the server. When this is received and outgoing call leg towards the IN defined destination is established and connected to the incoming leg.
6. The user can now use the downloaded ADSI script for the rest of the IN call.

ADSI Server as Networked IP

If the ADSI server is a Networked IP it needs an INAP (CS1) interface where at least the IP related INAP operations are implemented (see FIG. 1). The SCP can now have a direct communication with the ADSI server using IP operations and parameters. This allows more IN control of the ADSI server. And the ADSI server can initiate outgoing IN calls to ADSI terminals. The CS1 operation ETC is used to establish the connection.

Abbreviations

| ADSI | Analogue Display Services Interface |
| CPE | Customer Premises Equipment |
| DTMF | Dual Tone Multifrequency |
| FSK | Trequency Shift Keying |
| IDP | Initial Detection Point (CS1 operation) |
| IN | Intelligent Network |
| INAP | Intelligent Network Application Part |
| IP | Intelligent Peripheral |
| SCP | Service Control Point |
| SSP | Service Switching Point |
| PSTN | Public Switched Telephone Network |
| ISDN | Integrated Service Digital Network |
| DSS1 | Digital Subscriber Signalling System 1 |
| ATM | Automatic Teller Machine |
| ETC | Established Temporary Connection |
| UPT | Universal Personal Telecommunication |
| SDC | Server Display Control |
| SSF | Service Switching Function |
| SCF | Service Control Function |
| CS1 | Capability Set 1 |
| CON | Connect |

What is claimed is:

1. A user interface arrangement in a network structure, especially an IN (Intelligent Network) structure, comprising ADSI (Analogue Display Services Interface) and servers associated therewith and communicating with ADSI capable devices, wherein said ADSI servers are adapted to a system for use as IPs (Intelligent Peripherals) in combination with especially ADSI compliant telephones.

2. The arrangement as claimed in claim 1, wherein said system comprises a definition of IN trigger data in an associated SSP (Service Switching Point), said IN trigger data containing an ADSI indicator to be sent to a SCP (Service Control Point) in an IDP (initial Detection Point) operation.

3. The arrangement as claimed in claim 1, wherein said ADSI servers are configured with the appropriate IN/ADSI scripts.

4. The arrangement as claimed in claim 3, wherein at IN call-up a concerned SCP will control the downloading of ADSI script from the ADSI server to a caller.

5. The arrangement as claimed in claim 4, wherein when a call is set up from an ADSI complaint device, especially an ADSI telephone, a call indicator which is sent in said IDP operation will tell the SCP that the call is for a specific IN service from an ADSI terminal.

6. The arrangement as claimed in claim 5, wherein said SCP is adapted to set up a temporary connection (ETC) to an ADSI server which comprises the ADSI script for said terminal, so as to establish a connection between said ADSI terminal and said server.

7. The arrangement as claimed in claim 6, wherein said SCP is adapted for monitoring release message from the server, and upon the receipt thereof for establishing an outgoing call leg towards the IN defined destination and for the connection thereof to an incoming leg.

8. The arrangement as claimed in claim 7, wherein said downloaded ADSI script is used for the rest of the call.

9. The arrangement as claimed in claim 8, especially when an ASDI server is used as a networked IP, wherein there is provided an INAP (Intelligent Network Application Part) interface wherein at least IP related capability set 1 CS1 operations are implemented.

10. The arrangement as claimed in claim 9, wherein said ADSI server is adapted for initiated outgoing IN calls to one or more ADSI terminals, and is adapted for direct communication with said SCP.

11. A method in an intelligent network structure, for providing a user interface, the network being of the type using ADSI (Analogue Display Services Interface) and associated ADSI servers communicating with ADSI capable devices, comprising the step of adapting said ADSI servers to a system for use as Ips (intelligent Peripherals) in combination with ADSI compliant devices including ADSI compliant telephones.

12. The method as in claim 11, including the step of defining IN trigger data in an associated SSP (Service Switching Point), said IN trigger data containing an ADSI indicator to be sent to a SCP (Service Control Point) in an IDP (Initial Detection Point) operation.

13. The method as in claim 11, characterized in that said ADSI servers are configured with the appropriate IN/ADSI scripts.

14. The method as in claim 13, including the step at IN call-up, as a concerned SCP controlling downloading of ADSI script from the ADSI server to a caller.

15. The method as in claim 14, including the step of, when a call is set up from an ADSI compliant device, causing a call indicator which is sent in IDP to inform the SCP that the call is for a specific IN service from an ADSI terminal.

16. The method as in claim 15, including the step of adapting said SCP to set up a temporary connection (ETC) to an ADSI server which comprises the ADSI script for said terminal, and establishing a connection between said ADSI terminal and said server.

17. The method as in claim 16, including the step of adapting said SCP for monitoring a release message from the server, and upon the receipt thereof, establishing an outgoing call leg towards the IN defined destination and for the connection thereof to an incoming leg.

18. The method as in claim 17, including the step of using said downloaded ADSI script for the rest of the call.

19. The method as in claim 18, especially when an ADSI server is used as a networked IP, including the step of providing an INAP (Intelligent Network Application Part) interface wherein at least IP related capability set 1 (CS1) operations are implemented.

20. The method as in claim 19, including the step of adapting said ADSI server for initiated outgoing IN calls to one or more ADSI terminals, and adapting for direct communication with said SCP.

* * * * *